US006854744B2

(12) United States Patent
Brandler (10) Patent No.: US 6,854,744 B2
(45) Date of Patent: Feb. 15, 2005

(54) LIGHTWEIGHT CONVERTIBLE CAR SEAT AND STROLLER (76) Inventor: Janet E. Brandler, 8389 S. Valencia Cir., Sandy, UT (US) 84093

(*) Notice: Subject to any disclaimer, the term of this patent is extended or adjusted under 35 U.S.C. 154(b) by 0 days.

(21) Appl. No.: 09/918,665

(22) Filed: Jul. 31, 2001

(65) Prior Publication Data

US 2002/0038967 A1 Apr. 4, 2002

Related U.S. Application Data (60) Provisional application No. 60/236,685, filed on Sep. 29, 2000.

(51) Int. Cl.[7] .................................................. B62B 7/12
(52) U.S. Cl. .................... 280/30; 280/47.25; 280/47.38
(58) Field of Search ................................ 280/30, 47.25, 280/47.18, 47.26, 47.3, 5.24, 47.38, 47.39, 47.4, 648, 650, 658, 647, 657, 63; 297/231, 230, 467, 484, DIG. 4, 130, 250.1

(56) References Cited

U.S. PATENT DOCUMENTS

| 604,045 | A | * | 5/1898 | Hannahs | 280/47.25 |
|---|---|---|---|---|---|
| 2,661,959 | A | * | 12/1953 | Bell | 280/47.25 |
| 2,990,190 | A | * | 6/1961 | Eriksen | 280/47.25 |
| 3,227,467 | A | * | 1/1966 | Fugitt, Sr. | 280/47.25 |
| 3,829,113 | A | * | 8/1974 | Epelbaum | 280/30 |
| 4,537,414 | A |  | 8/1985 | Nusbaum |  |
| 4,620,711 | A |  | 11/1986 | Dick |  |
| 4,679,804 | A | * | 7/1987 | Johnson | 280/30 |
| 4,762,331 | A | * | 8/1988 | Tucker et al. | 280/30 |
| 4,828,281 | A |  | 5/1989 | Sanchas |  |
| 4,832,354 | A |  | 5/1989 | LaFreniere |  |
| 4,878,680 | A |  | 11/1989 | Molnar |  |
| 4,989,888 | A | * | 2/1991 | Qureshi et al. | 280/30 |
| 5,022,669 | A |  | 6/1991 | Johnson |  |
| 5,104,134 | A |  | 4/1992 | Cone |  |
| 5,149,113 | A |  | 9/1992 | Alldredge |  |
| 5,318,311 | A |  | 6/1994 | Bofill |  |
| 5,374,073 | A | * | 12/1994 | Hung-Hsin | 280/30 |
| 5,398,951 | A |  | 3/1995 | Ryu |  |
| 5,595,393 | A |  | 1/1997 | Batten |  |
| 5,707,106 | A |  | 1/1998 | Clark |  |
| 5,988,657 | A | * | 11/1999 | Henkel | 280/47.25 |
| 6,131,925 | A | * | 10/2000 | Weldon | 280/30 |
| 6,170,615 | B1 | * | 1/2001 | Cheng | 280/642 |
| 6,206,384 | B1 | * | 3/2001 | Chi et al. | 280/30 |
| 6,367,821 | B2 | * | 4/2002 | Thiele | 280/30 |

OTHER PUBLICATIONS www.safelinecorp.com/prodsns.htm website.

* cited by examiner

Primary Examiner—Hau Phan (57) ABSTRACT

A mobile children's seat having a wheel or set of wheels about a fulcrum point and a handle for tipping said mobile children's seat about the fulcrum point to transport a child in the mobile children's seat. The mobile children's seat for securing a child in a protective position in a vehicle and providing mobility without the need for additional components.

12 Claims, 9 Drawing Sheets

LIGHTWEIGHT CONVERTIBLE CAR SEAT AND STROLLER

PRIORITY CLAIM

Under the provisions of 35 U.S.C. § 1.19(e), priority is claimed from U.S. Provisional Patent Application Ser. No. 60/236,685 filed Sep. 29, 2000.

BACKGROUND OF THE INVENTION

1. Field of the Invention

The present invention relates generally to convertible children's vehicle seats. More particularly, the present invention involves a multifunction vehicle seat for an infant or toddler, that easily converts to a mobile seat for transporting an infant or toddler outside of a vehicle.

2. State of the Art

Children's vehicle seats and strollers are well known in the art. For years, manufacturers have been improving children's car seat designs to improve the safety and functionality of such seats. Particular functional design improvements include designs allowing greater mobility of the vehicle seats, such that the seats may be easily transferred from one vehicle to another. In addition, many of the children's vehicle seats available today are smaller and lighter, allowing a person to easily carry the seat with an infant or toddler secured therein. As the materials used to make the vehicle seats have become stronger and lighter, the demand for multi-functional seats has risen. For example, many of the children's vehicle seats double as bassinets, miniature cradles, and transportable carriers. Some of the seats are even designed to fit into a stroller housing so that an infant or toddler may be removed from a vehicle and placed in a stroller without disturbing the child in the seat.

Recently, multifunctional car seat/stroller units have also been gaining popularity. In an attempt to eliminate the amount of equipment necessary to operate a car seat/stroller unit, stroller functionality is incorporated into the car seat itself. Integration of stroller parts into a car seat eliminates the need for two pieces of equipment, the car seat and a stroller housing. The singular unit simplifies the process of transporting an infant or child.

One example of a car seat/stroller combination is illustrated and described in U.S. Pat. No. 5,104,134. The car seat/stroller design of that invention incorporates stroller functionality into a compartment in the base of the car seat. When used as a car seat, the incorporated stroller mechanism is hidden within the base of the car seat. When used as a stroller, retractable stroller legs with wheels extend from the base, providing classic four-legged stroller functionality to the seat. In addition, a telescoping handle built into the back of the car seat/stroller combination is used to push the car seat/stroller unit when operating the device as a stroller.

Other, similar car seat/stroller design combinations also exist. However, many of the designs require extensive effort to convert the car seat to a stroller unit. The additional components also add extra weight to the car seat, making it more difficult to handle and carry. In addition, many of the car seat/stroller combinations involve multiple moving parts prone to excessive wear or breakage.

Furthermore, the traditional stroller designs incorporated into the car seat/stroller combinations in use today are most efficiently operated by pushing the stroller. Although well accepted as the standard method of transporting a child, certain problems exist with such a configuration. For example, in crowds, the stroller unit is difficult to maneuver because the stroller precedes the individual pushing the stroller. Thus, the stroller is often times used to part the crowd. Maneuverability is also often times dependent upon the use of two hands and positions the user slightly forward, making it difficult for the user of the stroller to carry shoulder bags and other items or use one hand for other tasks.

A convertible vehicle seat/stroller type unit having minimal operating parts and which is easy for the operator to maneuver and handle is therefore desirable.

SUMMARY OF THE INVENTION

The present invention relates generally to convertible children's vehicle seats. More particularly, the present invention involves a multifunction vehicle seat for an infant or toddler that is easily converted to a mobile seat for transporting an infant or toddler outside of a vehicle.

In one embodiment of the present invention, a mobile children's seat comprises a children's seat, having a seat portion and a back portion, a set of wheels attached to a fulcrum point of the mobile children's seat, and a retractable handle integrated with the back portion of the mobile children's seat. With the handle stored in the back portion of the mobile children's seat, the seat acts and functions like a children's vehicle seat. Removed from a vehicle and sitting on the ground, the mobile children's seat is stable, such that a child may be secured in the seat. Thus, a mobile children's seat, having a child secured therein, may be removed from a vehicle and placed on the ground for mobile operation. To use the mobile children's seat as a child transport, the handle is extended and the mobile children's seat tipped onto the wheels about the fulcrum point. Using the handle, the mobile children's seat may be pushed or pulled to transport a child secured therein.

In another embodiment of the present invention the mobile children's seat includes retractable wheels. The retractable wheels may be retracted into the mobile children's seat, such as the back portion of the mobile children's seat, to give the mobile children's seat an appearance more similar to that of a children's vehicle seat. Although the mobile children's seat may be used as a vehicle seat when the wheels are extended, retracting the wheels eliminates any interference that the wheels may cause.

In addition, the present invention encompasses an adaptor for converting standard children's seats to mobile children's seats similar to the present invention. The adaptor comprises a support platform having wheels and a retractable handle. It is secured to a children's seat for use. Extending the handle, the children's seat secured to the adaptor may be tilted or tipped onto the wheels. The children's seat may be transported by pushing or pulling the children's seat connected to the adaptor.

DESCRIPTION OF THE DRAWINGS

While the specification concludes with claims particularly pointing out and distinctly claiming that which is regarded as the present invention, the advantages of this invention can be more readily ascertained from the following description of the invention when read in conjunction with the accompanying drawings in which:

DETAILED DESCRIPTION OF THE INVENTION

The present invention relates generally to convertible infant or toddler vehicle seats. More particularly, the present invention involves a multifunction vehicle seat for an infant or toddler, the vehicle seat easily converted to a mobile seat for transporting the infant or toddler outside of a vehicle.

The mobile children's seat of the present invention combines the safety and security of a children's vehicle seat with simple, yet effective mobility, thereby improving the functionality of a typical children's vehicle seat. In general, the mobile children's seat of the present invention includes a children's vehicle seat, a set of wheels attached to a fulcrum point of the children's vehicle seat, and a handle for pushing or pulling the mobile children's seat. When used as a vehicle seat for a child, the handle may be stored in a portion of the children's seat or detached so as not to interfere with the operation of the mobile children's seat as a vehicle safety seat. Similarly, the wheels may be retracted. The mobile children's seat may also be equipped with low-profile fixed wheels which do not interfere with the use of the mobile children's seat as a vehicle safety seat. Positioned in a vehicle, the mobile children's seat may be used just as any other children's vehicle safety seat is used, protecting the child seated in the mobile children's seat. In a mobile transportation mode, the mobile children's seat is removed from a vehicle with or without a child in the mobile children's seat. Placed on a surface such as a sidewalk, the wheels of the mobile children's seat are in contact with the surface. The handle may be extended and locked, providing a lever with which to tilt the mobile children's seat onto the wheels for mobility. The mobile children's seat is then pushed or pulled using the handle.

The preferred embodiments of the mobile children's seat 100 of present invention are illustrated in FIGS. 1 through 13. For the sake of clarity, the numbering of similar components of the mobile children's seat 100 remains consistent throughout all of the Figures.

Figure 1:
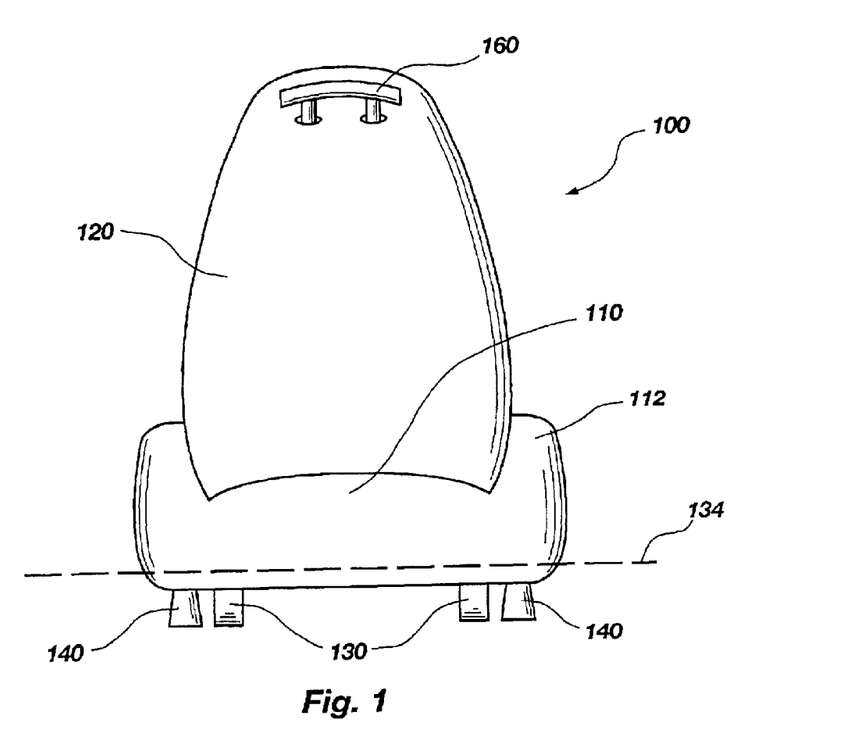
FIG. 1 is a rear view of a mobile children's seat of the present invention.
Figure 2:
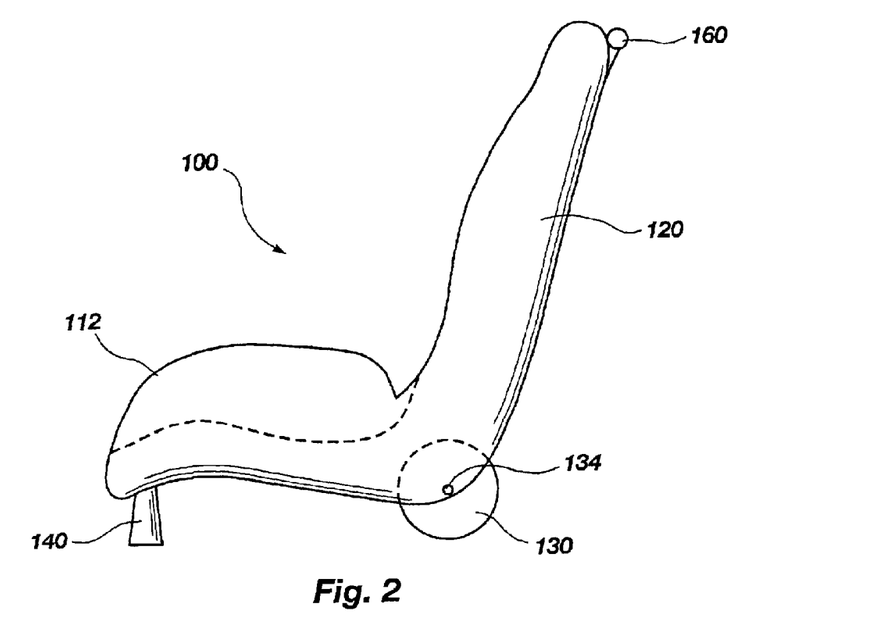
FIG. 2 is a side view of the mobile children's seat illustrated in FIG. 1.

FIG. 1 illustrates a front view of the mobile children's seat 100 of the present invention configured as a vehicle seat. Similarly, FIG. 2 illustrates a side view of the mobile children's seat 100 configured for placement on a vehicle seat. The mobile children's seat 100 includes a seat portion 110 and a back portion 120 positioned to support a child sitting in the mobile children's seat 100. For the purposes of describing this invention, a combination of the seat portion 110 and the back portion 120 is generally referred to as the child's seat. Optional armrest portions 112 may also be integrated with the child's seat to provide support for a child's arms while sitting in the mobile children's seat 100. Stoppers 140 and wheels 130 are positioned underneath the seat portion 110 of the mobile children's seat 100. In combination, the wheels 130 and the stoppers 140 provide a stable base for the child's seat. A handle 160 retracts into the back portion 120 of the mobile children's seat 100.

Each of the two wheels 130 is positioned along a fulcrum point 134 of the mobile children's seat 100. The fulcrum point 134 is positioned such that the child's seat will sit upright without tipping backwards during normal seated operation. In other words, in order to tip the mobile children's seat 100 about the fulcrum point 134, or onto the wheels 130, an additional physical force must be exerted upon the mobile children's seat 100 to cause such tipping. Generally, an additional physical force capable of tipping the mobile children's seat 100 onto the wheels 130 at the fulcrum point 134 is exerted upon an extended handle 160.

Furthermore, a locking mechanism (not shown) may be incorporated or attached to one or both of the wheels 130 to prevent any undesired movement of the wheels 130. Activation of the locking mechanism secures the wheel 130, thereby preventing unwanted movement of the mobile children's seat 100 when sitting in a stationary position. For example, the locking mechanism may require a user to push down on a locking switch (not shown) to engage a brake pad (not shown) to the wheel 130. Releasing the locking switch disengages the brake pad and allows the wheel 130 to move. Locking mechanisms of this sort, along with other designs, are well known in the art and will not be explained further herein.

Although wheels 130 are typically secured in a fixed position on the fulcrum point 134, retractable wheels 131 may be incorporated with the mobile children's seat 100 instead. Fixed wheels 130 are, however, preferable because they involve fewer moving parts, reducing the cost of making the mobile children's seat 100 and reducing the number of malfunctions occurring from broken moving parts.

Figure 3:
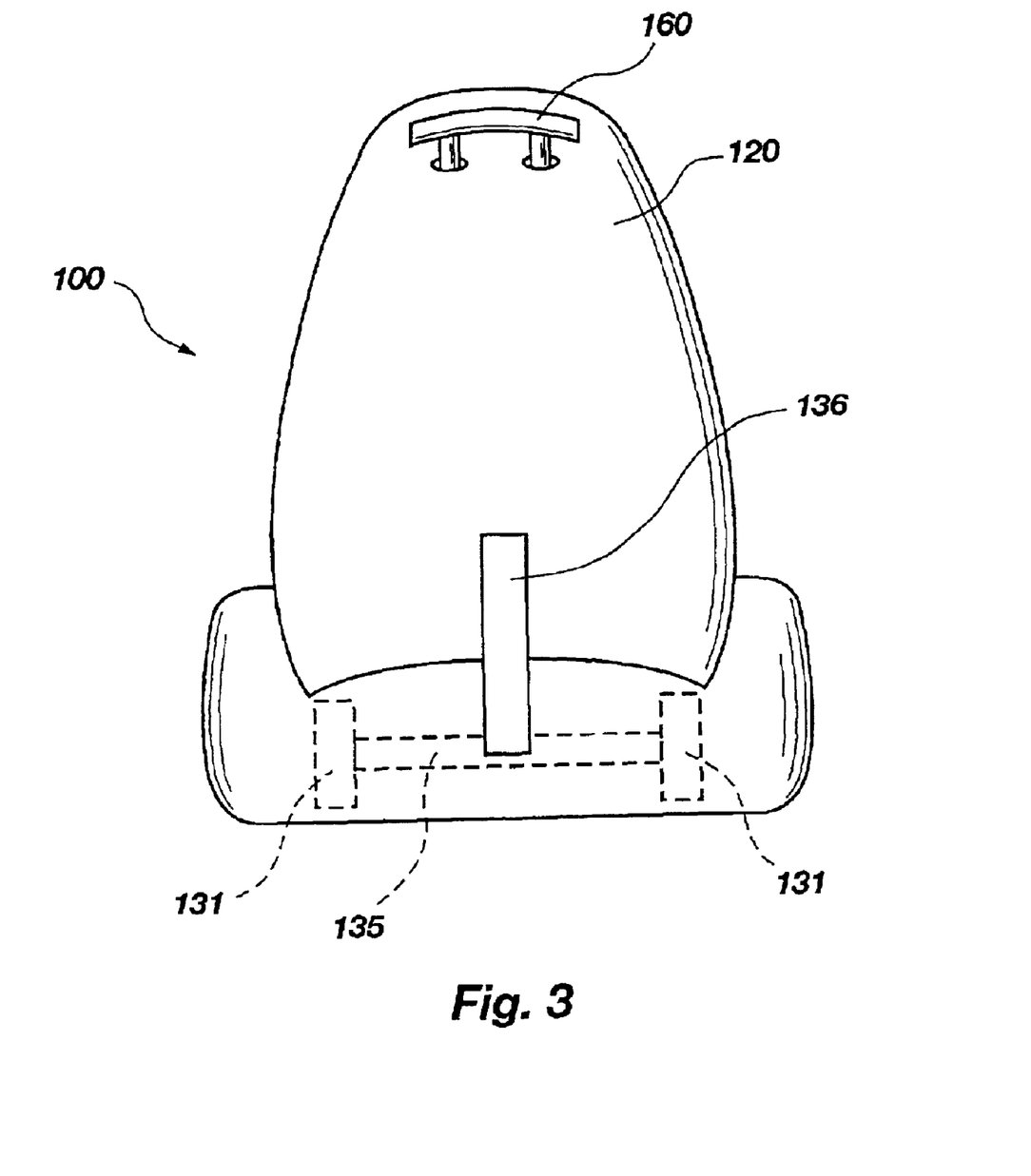
FIG. 3 is a rear view of an alternative embodiment of the present invention having retractable wheels.

One embodiment of the mobile children's seat 100, having retractable wheels 131 in a retracted position, is illustrated in FIG. 3. Retractable wheels 131 may be extended from or retracted into the seat portion 110 or back portion 120 of the mobile children's seat 100. When the retractable wheels 131 are in a retracted position the mobile children's seat 100 looks and operates as a common children's vehicle seat. Extension of the retractable wheels 131 into an operable position creates a mobile children's seat 100 similar to a fixed wheel mobile children's seat 100 illustrated in FIGS. 1 and 2. It is noted that in either embodiment, the fixed wheels 130 or the retractable wheels 131 are positioned so as not to interfere with the operational use of the mobile children's seat 100 as a children's vehicle seat.

To extend the retractable wheels 131, one of many mechanisms may be used. For example, referring to FIG. 3, the retractable wheels 131 may be mounted on a movable axle 135 connected to a lever 136, the lever 136 being used to extend or retract the retractable wheels 131. When pushed downward, the lever 136 forces the movable axle 135 downward, thereby extending the retractable wheels 131. Once the retractable wheels 131 are in an operable position, a locking mechanism, such as a spring lock (not shown), engages the lever 136, locking the retractable wheels 131 in the operable position. Release of the spring lock allows the lever 136 to be lifted, thereby retracting the retractable wheels 131 into the seat portion 110 or back portion 120 of the mobile children's seat 100. The lever 136 may also be locked into this disengaged or retracted position with a second spring lock.

Alternatively, the lever 136 may be spring loaded or hydraulically controlled to maintain the retractable wheels 131 in a retracted position. To extend the retractable wheels 131, one may apply sufficient force to the lever 136 to overcome the spring or hydraulics until the lever 136 is locked in an engaged position with, for example, a spring lock (not shown). Upon releasing the locking mechanism, the spring or hydraulic force automatically returns the retractable wheels 131 to a disengaged or retracted position. It is understood that many different extension and extraction mechanisms are well known and available in the art, thus further description thereof is omitted.

The present invention is not limited by the type of wheel 130, or rolling mechanism, used to provide mobility to the mobile children's seat 100. It is understood that many different mobility mechanisms known in the art may be used with the present invention. For example, a singular wheel (not shown), comprising a long tube capable of rolling along a surface, may be used in place of individual and separate wheels.

Figure 4:
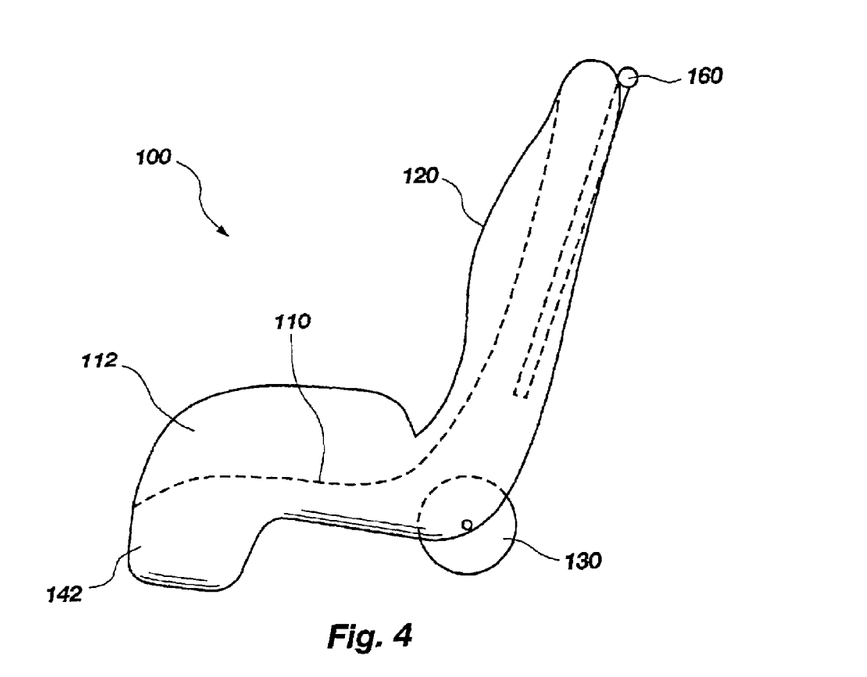
FIG. 4 is a side view of an alternative embodiment of the present invention.
Figure 5:
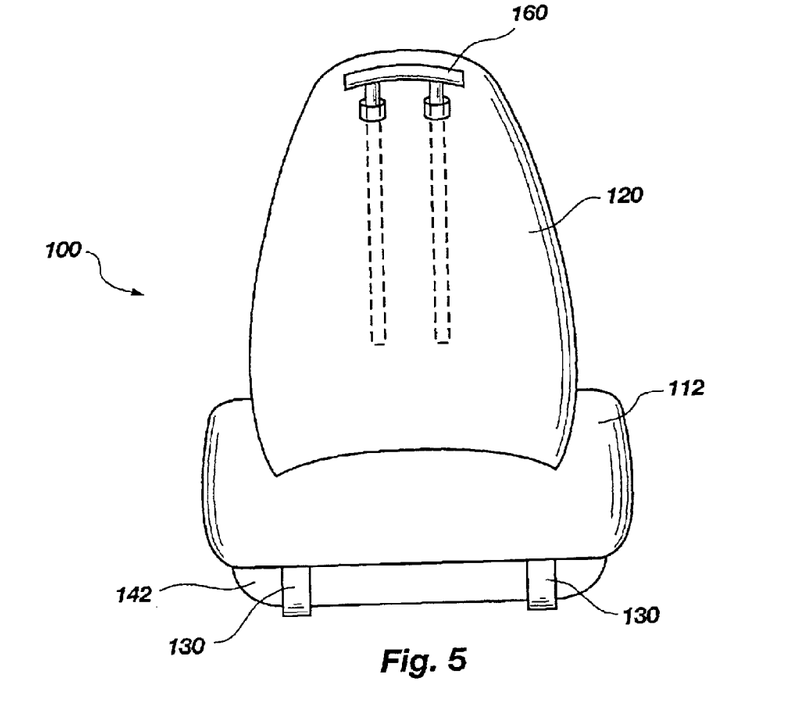
FIG. 5 is a rear view of the alternative embodiment illustrated in FIG. 4.

Again referencing FIGS. 1 and 2, the stoppers 140 provide stability to the mobile children's seat 100 in a seated or stationary position. The stoppers 140 also position the mobile children's seat 100 such that a child sitting in the child's seat sits in a comfortable position. Alternatively, the stoppers 140 may be replaced by an integrated base support 142 incorporated into the seat portion 110 of the mobile children's seat 100 as illustrated in FIGS. 4 and 5. As illustrated, in an alternate embodiment of the mobile children's seat 100, the seat portion 110 includes an integrated base support 142 configured to position the mobile children's seat 100 in a comfortable and safe position when the mobile children's seat 100 is set on a surface such as a sidewalk or positioned to carry a child in a vehicle.

Figure 6:
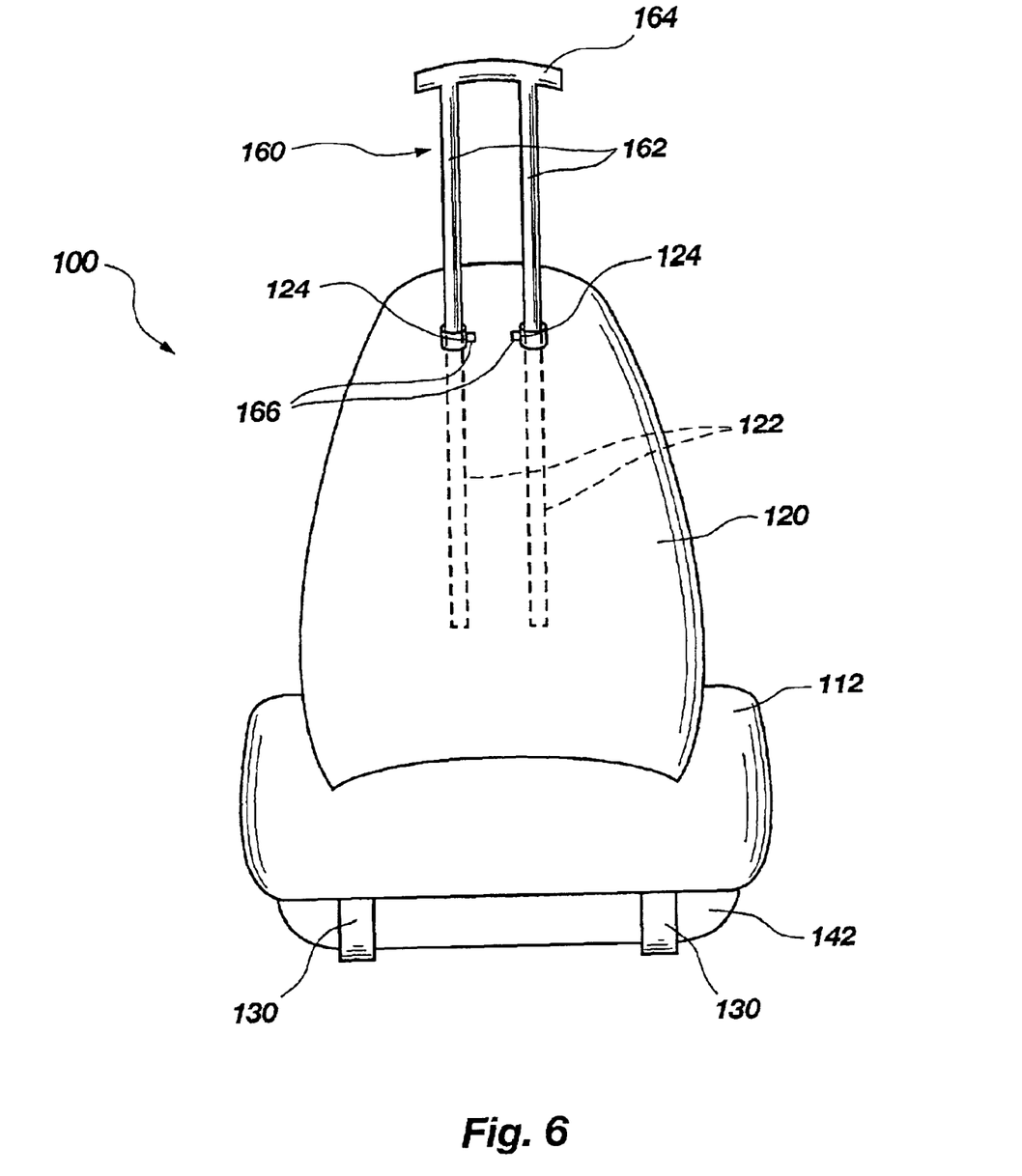
FIG. 6 is a rear view of the alternative embodiment illustrated in FIG. 4 having an extended handle.
Figure 7:
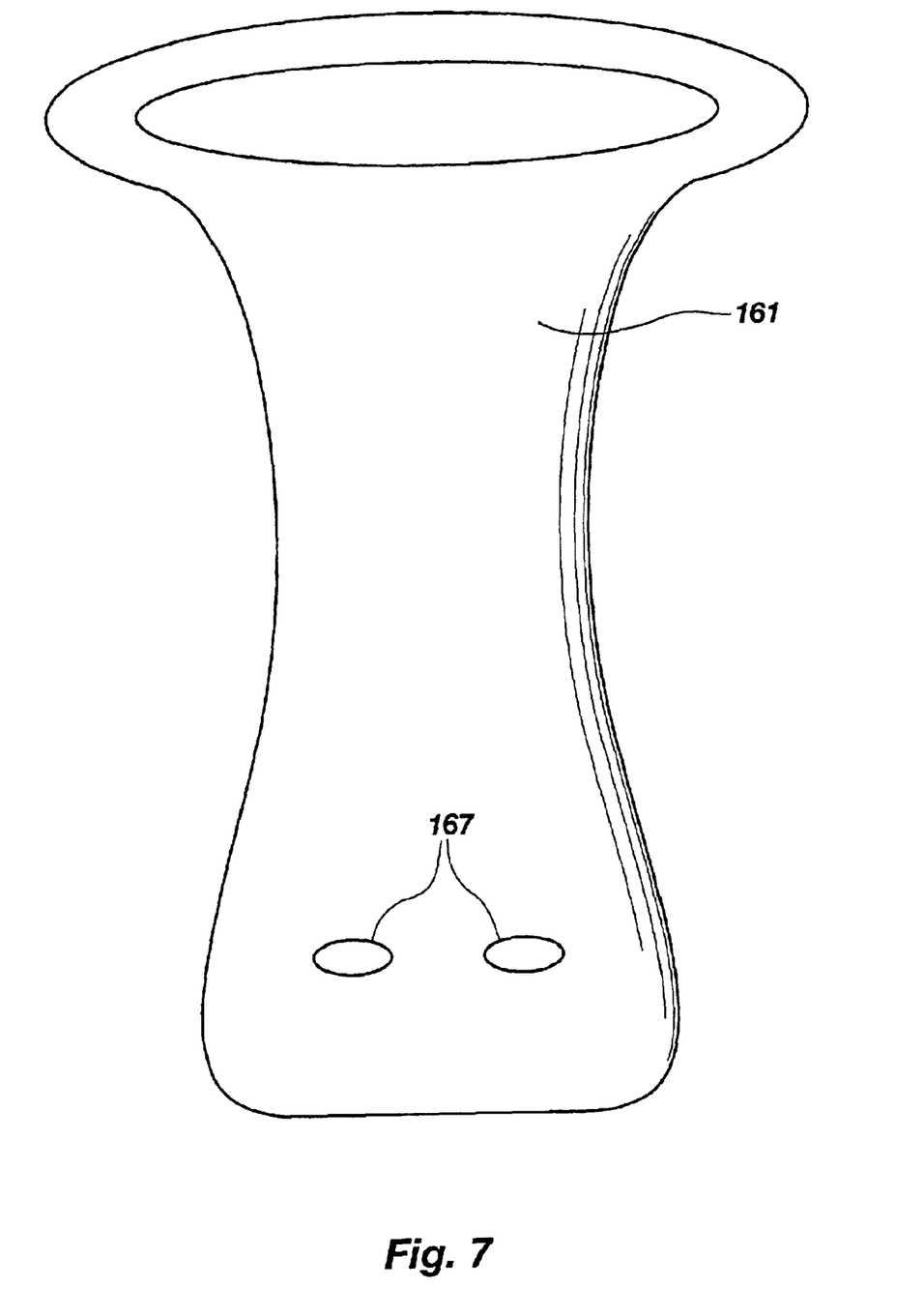
FIG. 7 is a diagram of an alternative handle embodiment of the present invention.

A handle 160 may be integrated with the mobile children's seat 100. In a preferred embodiment, the handle 160 is configured to extend and retract into the back portion 120 of the mobile children's seat 100. For example, a handle 160 depicted in an extended position is illustrated in FIG. 6. The handle 160 may include a handle grip 164 spanned between and joining two handle arms 162. Each of the handle arms 162 fit into handle tubes 122 incorporated into the back portion 120 of the mobile children's seat 100. The handle arms 162 are movable within the handle tubes 122 such that all but the handle grip 164 of the handle 160 may be hidden within the back portion 120 of the mobile children's seat 100. When extended, the handle 160 may be locked into an extended position. For example, spring buttons 166 incorporated into the handle arms 162 fit into button holes 124 in the exposed portions of the handle tubes 122. The spring buttons 166 may be aligned on the handle arms 162 such that when the handle 160 is extended, the spring buttons 166 click into position within the button holes 124 and lock the handle 160 into position. To unlock the handle 160, the spring buttons 166 may be pushed inwards as a downward force is exerted on the handle 160 such that the spring buttons 166 become enclosed within the handle tubes 122, allowing the handle 160 to be pushed back into a retracted position. Similar handle locking mechanisms, including telescoping handles with multiple locking devices, are common in the art. It is understood that other handle locking mechanisms could be readily incorporated into the present invention.

Similarly, alternate handle 160 shapes and configurations may be incorporated with the mobile children's seat 100 of the present invention. For example, the unitary handle 161 illustrated in FIG. 7 may comprise a unitary body and grip and can include larger spring buttons 167. The unitary handle 161 design may provide additional structural strength to the mobile children's seat 100, allowing greater control of the maneuverability of the mobile children's seat 100 in mobile operation. Likewise, the larger spring buttons 167 may improve the ease by which the unitary handle 161 may be deployed and used with the mobile children's seat 100.

Alternatively, a detachable handle (not shown) could be incorporated with the mobile children's seat 100. A detachable handle may attach to the back portion 120 of the mobile children's seat 100 using fastening mechanisms as known in the art.

In addition to a handle 160, the mobile children's seat 100 may include additional lifting handles (not shown). For example, a lifting handle shaped to fit an adult's hand may be molded into the back portion 120 of the mobile children's seat 100 to aid with the removal of the mobile children's seat 100 from a vehicle. An additional lifting handle may be molded into the seat portion 110 of the mobile children's seat 100 such that a person lifting the mobile children's seat 100 could do so by grasping two lifting handles, making it easier to insert and extract a mobile children's seat 100 from a vehicle.

The mobile children's seat 100 of the present invention may also include safety features and devices generally associated with children's vehicle seats or safety seats. For example, the mobile children's seat 100 may include a retention system (not shown), such as a five-point seat harness, for safely securing a child in the mobile children's seat 100. A restraint system similar to or like the ones used by race car drivers would also be desirable. Additional straps or connection devices may also be incorporated into the mobile children's seat 100 so that the mobile children's seat 100 may be secured to a vehicle seat. Such connection devices and methods are well known in the art of children's safety seat design and, therefore, further discussion of such devices is omitted.

Additional accessories may also be incorporated or attached to the mobile children's seat 100 of the present invention. For example, a sun-screen to protect a child seated in the mobile children's seat 100 may be attached thereto. Similarly, other items could be attached to the mobile children's seat 100 of the present invention. For example, attachments may include a sun/rain canopy, a diaper bags attachment, storage compartments, attachment straps for attaching bags or miscellaneous items, an eating/playing tray, arm rests, foot rests/protectors, entertainment devices such as built in electronic games, dvd/tv or movie players, built in beverage bottles, and the like.

Figure 8:
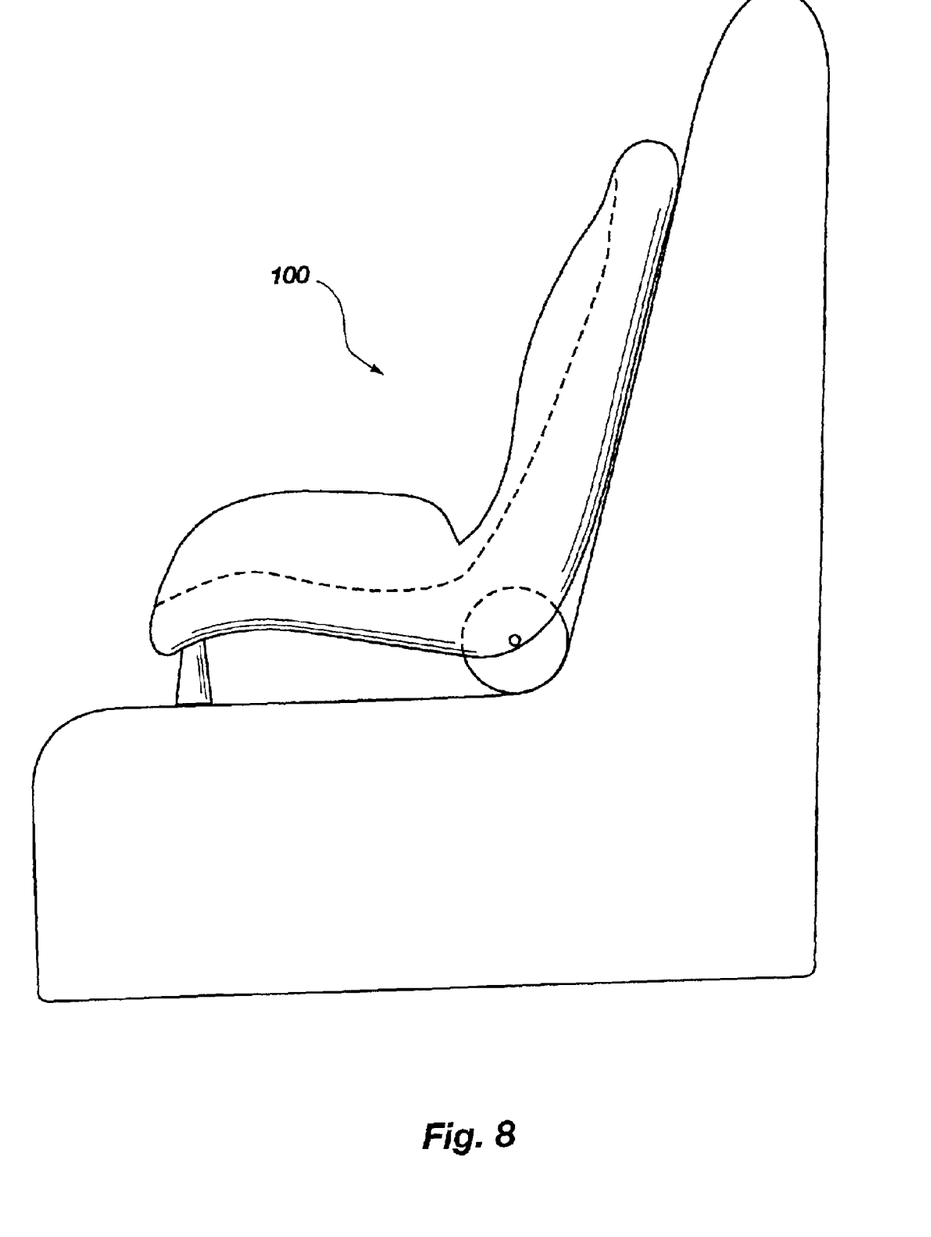
FIG. 8 is a diagram of the mobile children's seat of the present invention used as a vehicle seat.
Figure 9:
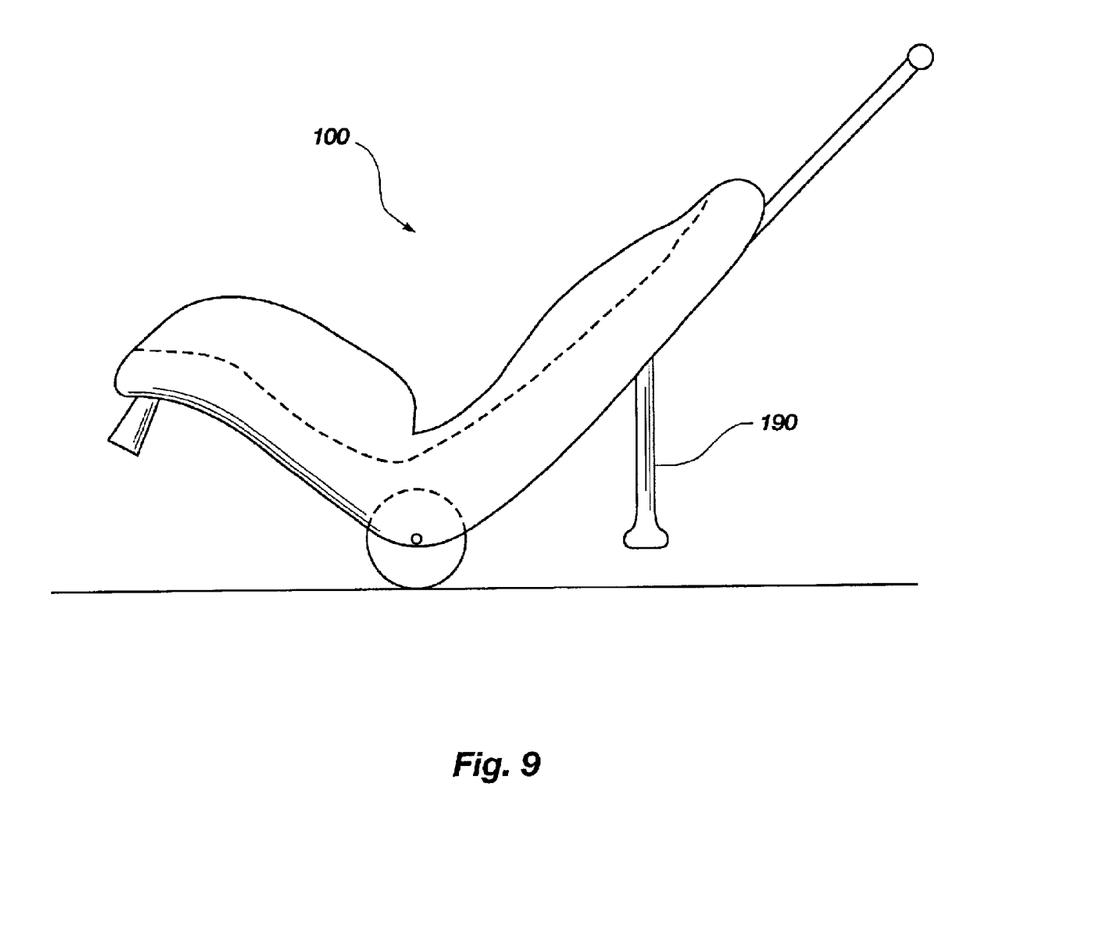
FIG. 9 is a diagram of the mobile children's seat tilted along a fulcrum point for mobility.

Referring to FIGS. 8 and 9, use of the mobile children's seat 100 of the present invention is described. FIG. 8 illustrates the mobile children's seat 100 of the present invention secured within a vehicle, such as a car. Although the mobile children's seat 100 is illustrated in a forward facing position, it is understood that the mobile children's seat 100 may also be positioned in a rearward facing position as known in the art. Furthermore, the mobile children's seat 100 may include any or all of the mandated safety features for children's vehicle seats. When used as a children's vehicle seat, the mobile children's seat 100 of the present invention secures and protects the child secured therein.

When removed from a vehicle and set on the ground or similar surface, the mobile children's seat 100 provides a stable seat for a child secured therein. Even with fixed wheels 130, or extended retractable wheels 131, the mobile children's seat 100 is stable, and may conform to any or all of the mandated safety requirements.

Extending the handle 160 into an operable position and applying the necessary force controllably tips or rotates the mobile children's seat 100 into a mobile position. An example of such a mobile position is illustrated in FIG. 9. A mobile children's seat 100 in the mobile position may be pushed or, preferably, pulled. The mobile children's seat 100 may also be easily maneuvered around obstacles or along a preferred course.

For example, operation of the mobile children's seat 100 may resemble the operation of a carry-on luggage bag commonly used by travelers. A child may be pulled in the mobile children's seat 100 in the same fashion that one would pull a carry-on luggage bag. This offers many advantages over the car seat/stroller combinations currently available on the market. For instance, when being pulled, the mobile children's seat 100 follows the individual pulling the mobile children's seat 100, allowing more efficient maneuverability because the pulling individual clears a path for the mobile children's seat 100 to follow. Unlike currently available strollers, the child in the mobile children's seat 100 is not being used to clear a path. Additionally, the mobile children's seat 100 is easily operated with one hand. This frees up one of the pulling individual's hands, allowing them to carry additional items or perform different tasks. The mobile children's seat 100 also provides a safe and comfortable position for the child secured therein. For example, when sleeping, a child's head is in a comfortable, reclined position rather than an uncomfortable hanging position often associated with other car seat/stroller units.

A swing arm 190 may also be integrated into the back portion 120 of the mobile children's seat 100 as an additional safety feature or operational feature. The swing arm 190 may swing freely with gravity or may be locked into a designated position. For example, a tipped mobile children's seat 100 in the transportation mode is illustrated in FIG. 9. A swing arm 190 swinging freely with gravity maintains a substantially perpendicular position with respect to the surface along which the mobile children's seat 100 is being pushed or pulled. Of course, if the mobile children's seat 100 is being pushed or pulled up or down a hill, the swing arm will not be perpendicular with respect to the surface. In any event, having been tipped onto the wheels 130 at the fulcrum point 134, the mobile children's seat 100 will continue to tip backwards until the back portion 120 of the mobile children's seat 100 touches the ground. Thus, if the handle 160 of the mobile children's seat 100 is accidentally released or dropped, the mobile children's seat 100 could crash to the ground, scaring the child in the mobile children's seat 100. An accident of this type is prevented with deployment of the swing arm 190. If the mobile children's seat 100 illustrated in FIG. 9 is dropped when transporting a child, the swing arm 190 would prevent the mobile children's seat 100 from dropping to the ground. Although, the distance to the ground is minimal and the seat's design will not allow the child to drop forward, only backward where the child is protected by the seat frame, a swing arm 190 may be desirable as it has other functions.

The swing arm 190 may also be locked into position and used as a support stand for the mobile children's seat 100. The swing arm may also be configured in a tripod fashion for stability. In this manner, swing arm 190 acts much like a kick-stand for a bicycle or motorcycle, supporting the mobile children's seat 100 in a reclined position. A child seated in a reclined mobile children's seat 100 supported by a swing arm 190 could be maintained in such reclined position, thus reducing the likelihood that the child will awake due to a change in position.

An alternative embodiment of the present invention is illustrated in FIGS. 10 through 13. The illustrated children's seat mobility adaptor 200 allows an individual to convert a standard children's seat into a children's seat similar to the mobile children's seat 100 described herein. Although a preferred embodiment of the mobility adaptor 200 is illustrated, it is understood that similar, alternate embodiments are also encompassed, as the mobility adaptor 200 may differ slightly for each brand of children's seats to which it is adapted.

The mobility adaptor 200 may include a seat plate portion 210, one or more wheels 230 attached to an axle 231 moveably fixed to the seat plate portion 210, and a handle assembly 260 attached to the seat plate portion 210. The seat plate portion 210 may include a hole 212 for attaching a children's vehicle seat to the mobility adaptor 200 with a bolt or other fastening device. Although a mobility adaptor 200 with the seat plate portion 210 is illustrated in FIGS. 10 through 13, it is understood that the seat plate portion 210 is not required. Stoppers 240, may be attached to the seat plate portion 210 to provide stability when the mobility adaptor 200 is in an upright position. The handle assembly 260 includes handle arms 262 mounted in handle tubes 222 and a handle grip 264 spanning and joining the handle arms 262. Spring buttons (not shown) may be incorporated with the handle arms 262 in a manner similar to that of the mobile children's seat 100. Likewise, button holes (not shown) in the handle tubes 222 may be provided to accept the spring buttons of the handle arms 262 when the handle arms 262 are extended, thereby locking the handle arms 262 in position. The mobility adaptor 200 also includes attachments 270 to fasten a children's vehicle seat to the mobility adaptor 200. The attachments 270 may include clamps, bolts, straps, or other fastening devices capable of securing a children's vehicle seat to the mobility adaptor 200 of the present invention.

Figures 10, 11:
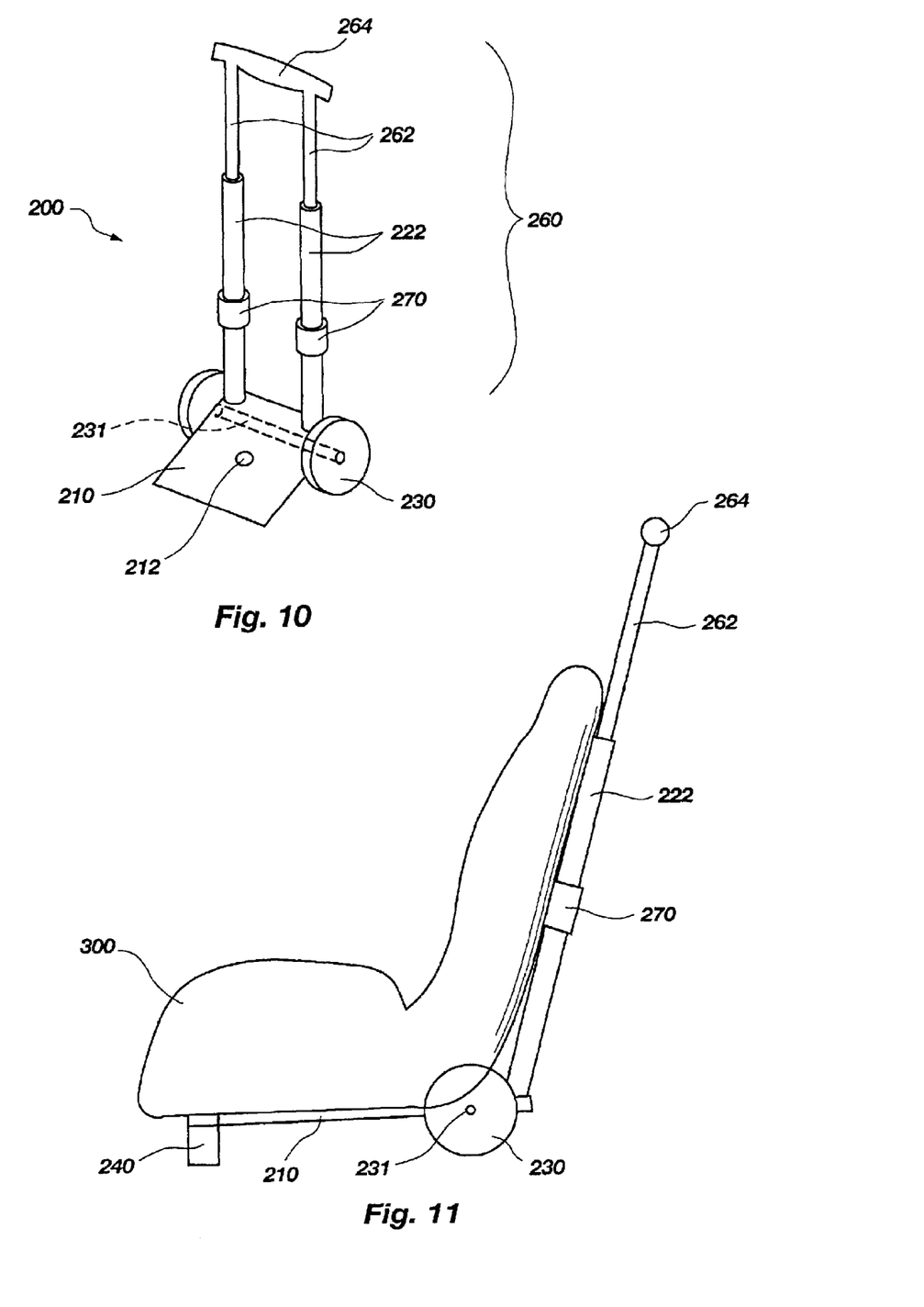
FIG. 10 is an alternative embodiment of the present invention.
FIG. 11 is a side view of a standard children's seat attached to the alternative embodiment of the present invention illustrated in FIG. 10.
Figure 12:
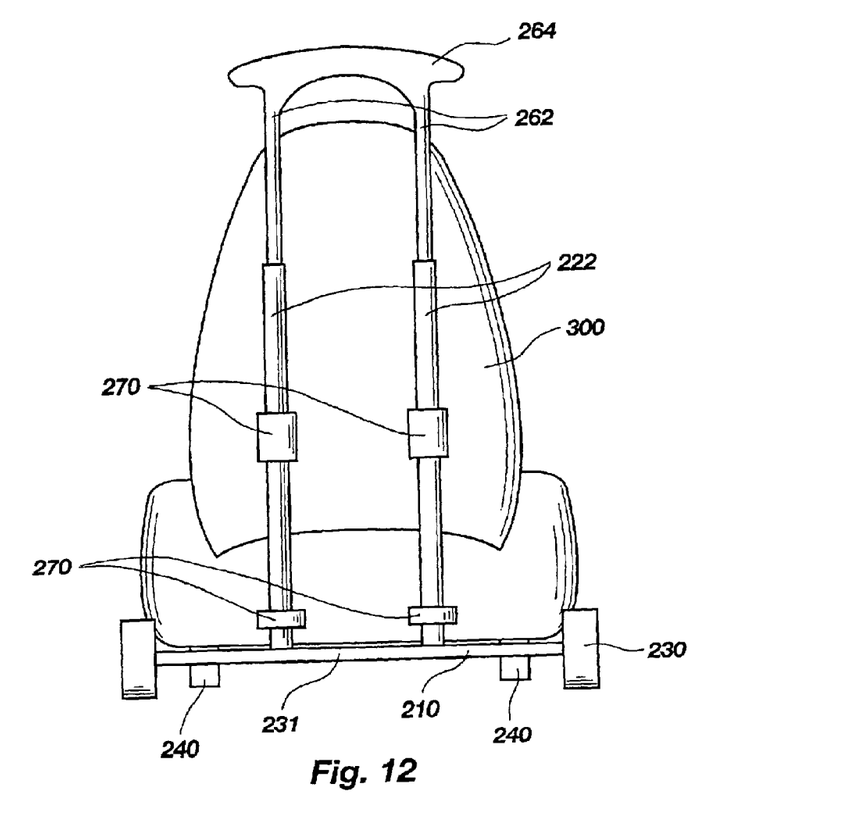
FIG. 12 is a rear view of a standard children's seat attached to the alternative embodiment of the present invention illustrated in FIG. 10.
Figure 13:
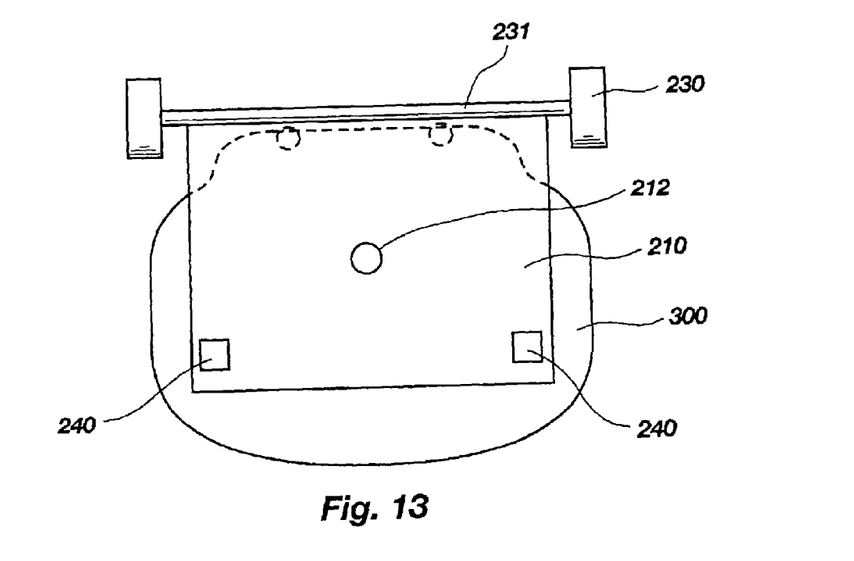
FIG. 13 is a bottom view of a standard children's seat attached to the alternative embodiment of the present invention illustrated in FIG. 10.

A mobility adaptor 200 attached to children's vehicle seat 300 is illustrated in FIGS. 11 through 13. As illustrated, the mobility adaptor 200 is configured to conform to the shape of the children's seat 300 to provide a low profile addition to the children's seat 300. The seat plate portion 210 attaches to the bottom of the children's seat 300 using a fastening device sufficient to secure the children's seat 300 to the mobility adaptor 200. For example, a bolt (not shown) inserted through hole 212 and into an adapted bolt hole in the children's seat 300 may be used to secure the mobility adaptor 200 to the children's seat 300. Additional fastening devices 270 secure the back of the children's seat 300 to the handle tubes 222.

In an alternative embodiment (not shown) the handle assembly may be incorporated into a back support portion capable of housing the handle assembly in a retracted position. The back support portion of a mobility adaptor 200 helps to support and fasten a children's seat 300 to the mobility adaptor 200.

The mobility adaptor 200 allows a regular children's seat to be adapted to function like the mobile children's seat 100 of the present invention. Once secured to a children's seat, the mobility adaptor 200 may be left on the seat with only occasional checks of the fastening devices 270 to insure that the children's seat is securely fastened to the mobility adaptor 200. Thus, the mobility adaptor 200 and children's seat operates as a single piece of equipment, providing mobility to children's seats.

Having thus described certain preferred embodiments of the present invention, it is to be understood that the invention defined by the appended claims is not to be limited by particular details set forth in the above description, as many apparent variations thereof are possible without departing from the spirit or scope thereof as hereinafter claimed.

What is claimed is:

1. A children's vehicle seat which is capable of being used as both a seat and as a stroller, comprising:
    a seat portion for supporting a child in a sitting position, said seat portion including a bottom portion having a recess therein;
    a back portion connected to said seat portion to support a child's back in said sitting position;
    a single wheel assembly moveably attached to said seat portion at a fulcrum point thereof, said single wheel assembly comprising a first wheel and a second wheel, a first portion of each of said first wheel and said second wheel extending below said bottom portion of said seat portion and a second portion of each of said first wheel and said second wheel extending into said recess in said bottom portion of said seat portion when said children's vehicle seat is used as a seat; and
    a handle connected to said back portion for tipping said children's vehicle seat onto said single wheel assembly to a reclined position for pushing or pulling said children's vehicle seat.

2. The children's vehicle seat of claim 1, wherein said single wheel assembly further comprises an axle moveably attached to said seat portion of said children's vehicle seat, wherein said first wheel is attached to a first end of said axle and said second wheel is attached to a second end of said axle, said single wheel assembly for rolling said children's vehicle seat in said reclined position.

3. The children's vehicle seat of claim 2, wherein said single wheel assembly further comprises a locking mechanism for securing said axle for preventing said movement thereof.

4. The children's vehicle seat of claim 2, wherein said single wheel assembly further comprises a locking mechanism for securing at least one of said first wheel and said second wheel from rolling.

5. The children's vehicle seat of claim 1, wherein said handle connected to said back portion comprises:
    at least one handle tube incorporated into said back portion; and
    at least one handle arm moveably contained within said at least one handle tube, said handle arm being extendable and retractable from said handle tube.

6. The children's vehicle seat of claim 5, wherein said handle further comprises a handle grip attached to said at least one handle arm at an exterior of said handle tube for extracting and retracting said at least one handle arm.

7. The children's vehicle seat of claim 5, wherein said handle further comprises:
    at least one spring button attached to said at least one handle arm;
    at least one spring button hole in said at least one handle tube for receiving said at least one spring button to secure said handle in a fixed position.

8. The children's vehicle seat of claim 1, further comprising a swing arm attachment incorporated into said back portion of said children's vehicle seat.

9. The children's vehicle seat of claim 8, wherein said swing arm attachment freely swings with gravity.

10. The children's vehicle seat of claim 8, wherein said swing arm attachment is lockable in a fixed position to support said children's vehicle seat in a reclined position.

11. The children's vehicle seat of claim 1, further comprising attachments to secure accessories to said children's vehicle seat.

12. The children's vehicle seat of claim 11, wherein said accessories include accessories chosen from the group consisting of bottle holders, toy holders, sun visors, rain canopy, diaper bag attachment, storage compartments, attachment straps, eating trays, arm rests, foot rests, foot protectors, entertainment devices, electronic games, movie players, and beverage bottles.

* * * * *